Oct. 24, 1967  S. M. STRAND  3,349,308
DIGITAL MOTOR SPEED AND POSITION REGULATOR
FOR LOW SPEED OPERATION
Filed May 4, 1964  3 Sheets-Sheet 1

Inventor
Sanford M. Strand
By H R Rather
Attorney

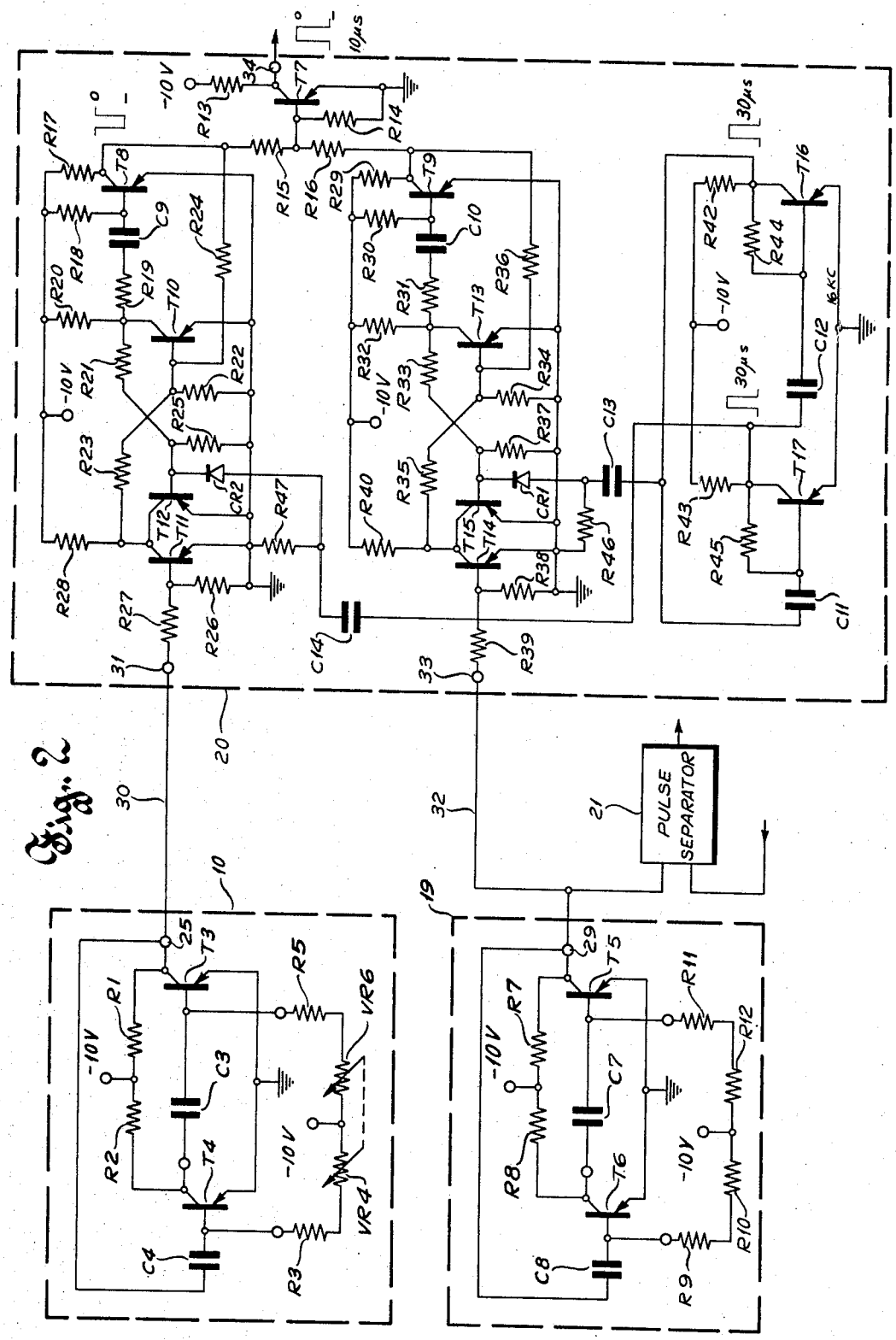

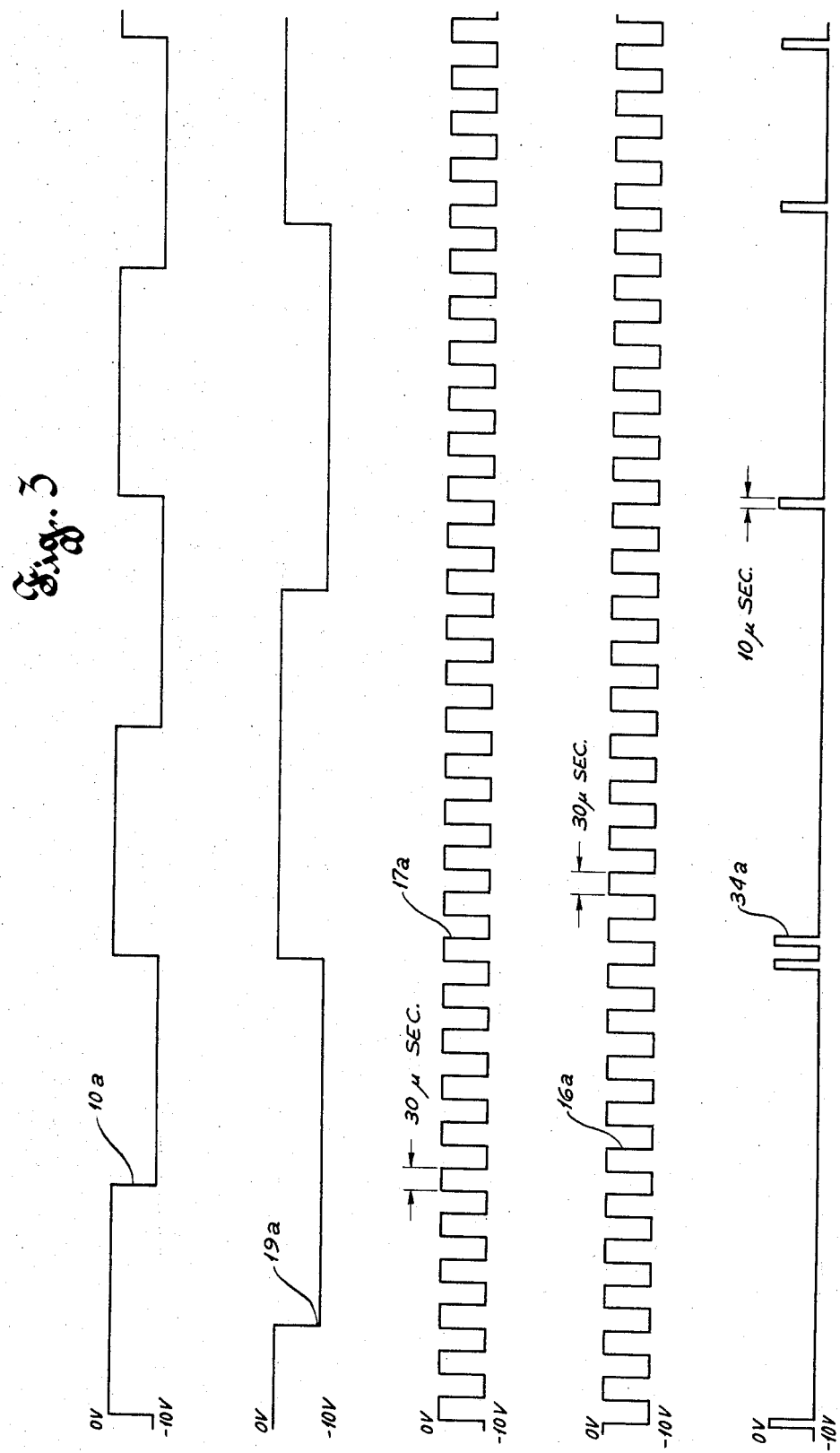

3,349,308
DIGITAL MOTOR SPEED AND POSITION REGULATOR FOR LOW SPEED OPERATION
Sanford M. Strand, Milwaukee, Wis., assignor to Cutler-Hammer, Inc., Milwaukee, Wis., a corporation of Delaware
Filed May 4, 1964, Ser. No. 364,676
7 Claims. (Cl. 318—314)

This invention relates to digital motor speed and position regulator for low speed operation.

In the Strand and Kintner Patent No. 3,331,006, issued July 11, 1967, there is described an improved type of digital speed and position regulator for electric motors. As there described, the system functions well when the range of motor speeds does not exceed 10 to 1. However, if the range is made appreciably beyond a 10 to 1 ratio, the frequency of the position correction pulses becomes so low at slow speeds that each pulse produces a noticeable change in motor speed. While the average motor speed is maintained constant under such conditions, the instantaneous motor speed may vary quite widely from the desired speed.

It is therefore an object of the present invention to provide a speed and position regulating system of the type which is capable of smooth and accurate position error correction down to low speed without producing wide variations in instantaneous motor speeds.

Another object is to provide digital circuitry which can be added to most any form of digital speed and position regulating system to provide the aforementioned slow speed operation.

A further object is to provide a system of the aforementioned character in which pulses of a predetermined frequency are added to the reference generator pulses, and also to the motor speed error pulses, so that at zero speed the position error signal regulator will be subject to a predetermined minimum number of input pulses per unit time which are at a sufficiently high rate to insure smooth operation.

Other objects and advantages will hereinafter appear.

The accompanying drawings illustrate preferred embodiments of the invention which will now be described, it being understood that the embodiments illustrated are susceptible of modifications without departing from the scope of the appended claims.

In the drawings:

FIG. 2 is a detailed diagram of the portion of the control system shown in FIG. 1;

Figure 4:
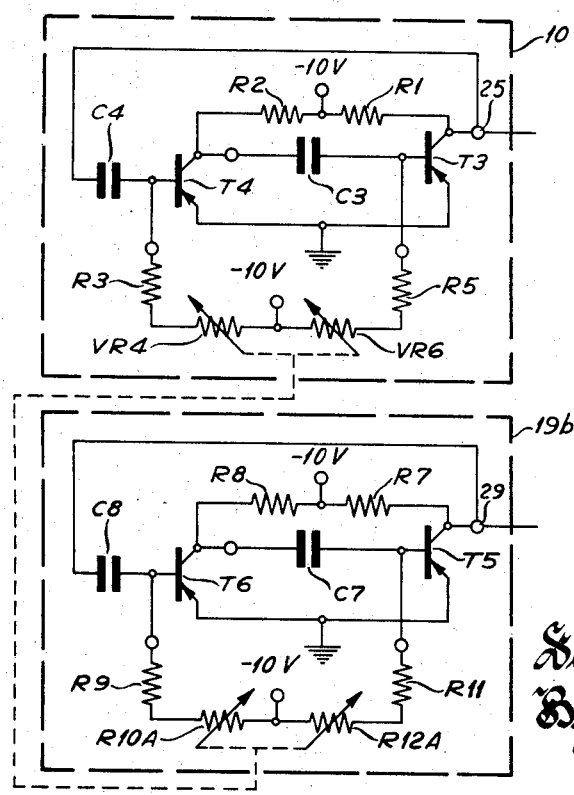

FIG. 3 graphically depicts pulses provided at different points in the portion of the system depicted in FIG. 2; and FIG. 4 shows a modification of certain apparatus of FIG. 2.

Figure 1:
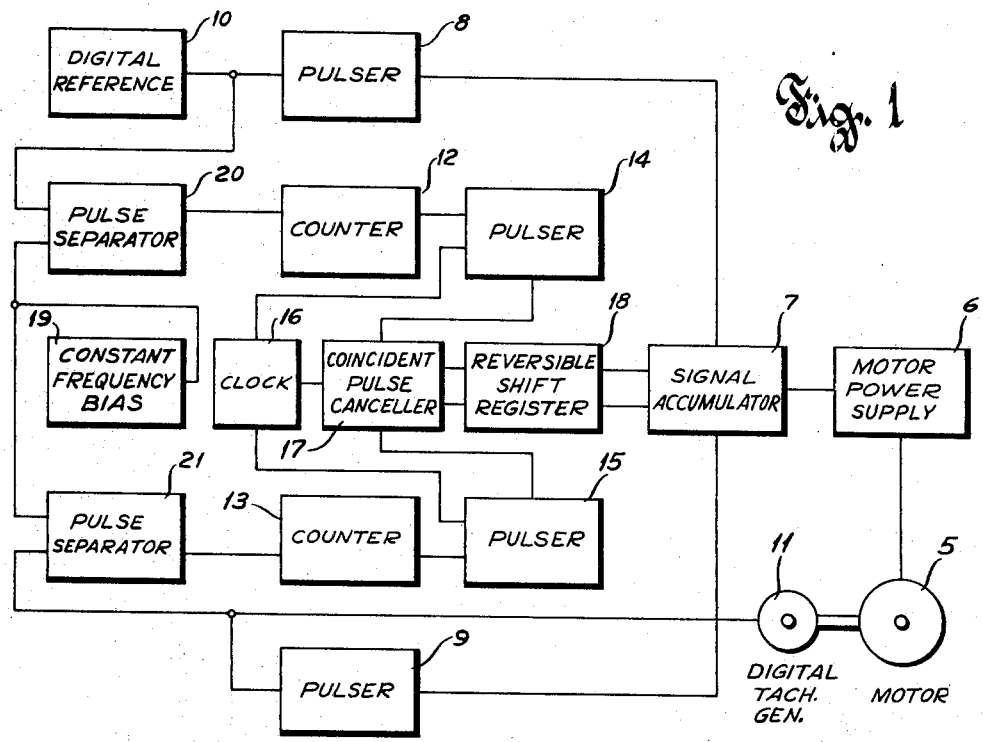
FIGURE 1 is a representation in block diagram form of a digital motor speed and position regulating system incorporating the invention.

In FIG. 1 a motor and control system therefore comprises a D.C. motor 5 which may be connected to drive a suitable load (not shown), and a power supply 6 which supplies motor 5 with armature voltage regulatable in magnitude. Power supply 6 in turn is controlled by an analog control voltage from a signal summer-integrator 7.

The summer-integrator 7 is supplied from pulsers 8 and 9 with input pulses of a predetermined amplitude and time period width, but varying in frequency. The output frequency of pulses from pulser 8 is determined by input pulses supplied to it from a reference pulse generator 10, which may be assumed to supply pulses at a constant but adjustable frequency. The frequency of the pulse output of pulser 9 is determined by the rate of input pulses supplied by a digital tachometer generator 11 which is driven by the shaft of motor 5. The portions of the control system thus far described provide for speed regulation of motor 5.

The control system further comprises counters 12 and 13, pulser-drivers 14 and 15, a synchronous clock 16, a coincident pulse canceller 17 and a phase displacement signal generator 18. Counter 12 is supplied with input pulses from reference pulse generator 10 and also from a constant frequency pulse generator 19. The pulses from generators 10 and 19 are fed intermediately to a pulse separator 20 which insures that all pulses generated by generators 10 and 19 are fed through the pulser-driver 14 regardless of their coincidence or near coincidence in point of time. Counter 13 is supplied with input pulses from tachometer generator 11 and generator 19 which feed through a second pulse separator 21. Except for the addition of constant frequency pulse generator 19 and the pulse separators 20 and 21 the control system is identical to that disclosed and claimed in the aforementioned Strand and Kintner patent.

With motor 5 running at a different speed than that dictated by the digital reference generator, the duration width of the pulses at the output of counter 13 will be less or greater than the width of the output pulses from counter 12. Moreover, the time phase difference between such sets of output pulses will be in accordance with difference of the angular position lead or lag between motor 5 and its reference speed device. If digital reference generator 10 were replaced by a digital tachometer, like generator 11, driven by a lead motor with which it is desired to have the speed and position of motor 5 run in synchronism, then the last mentioned time phase lead or lag between output pulses of counters 12 and 13 would indicate the angular position lead or lag of the shaft of motor 5 with respect to the shaft of the lead or reference motor.

The output pulses generated in counters 12 and 13 are fed into the pulser-drivers 14 and 15, respectively, to provide output pulses of the same amplitude and time duration width. These latter pulses are then fed into the coincident pulse canceller 17 which permits the pulse from one pulser to pass through to input of signal generator 18, if a preceding pulse from the other pulser precedes it in time by an amount greater than a given amount, say 100 micro-seconds. If the time phase between any successive pulses from the two pulsers is less than the given time, apart, both are effectively canceled and will not pass through to signal generator 18. This cancellation of coincident, or near coincident, pulses eliminates unnecessary operation of generator 18 and prevents possible erratic operation of signal generator 18.

Signal generator 18 is essentially a reversible shift register which shifts a single information "bit" between five information storage elements. If differs from normal reversible shift registers in that the information "bit" can never be cleared out of the end storage elements, and under certain conditions of input signals the "bit" stays in the end storage elements. As is described in detail in the aforementioned Strand and Kintner patent, the storage elements of generator 18 are provided with two sets of gates, one set being excited by the reference generator initiated pulses supplied to it from one output terminal of pulse canceller 17 to shift the information "bit" from left to right, between storage elements. The other set of gates when excited by the tachometer generator initiated pulses supplied to it from the other output terminal of pulse canceller 17 shifts the "bit" from right to left between storage elements.

As pulses initiated by the reference generator are interspersed between pulses initiated by the tachometer generator, the information "bit" circulates back and forth between adjacent storage elements. If the lead or lag is below a predetermined deviation limit the "bit" will stay in the center storage element. As the lead or lag exceeds such limit, but is below another upper limit, the "bit" circulates back and forth between the center element, and one of the storage elements immediately adjacent at either side thereof. When the "bit" is in one of the last mentioned storage elements a positive voltage of a predetermined magnitude is supplied to an input of summer-integrator 7, and when in the other a positive output voltage of a similar magnitude is supplied to another input of summer-integrator 7. The duration of such positive output voltage is dependent upon the time periods that the "bit" is in the storage elements immediately to one side or the other of the center storage element. Such voltages are of a pulse-like character, but are in effect analog quantities whose volt-second content are directly proportional to the lag or lead between motor 5 and the reference generator regardless of the reference frequency.

When the lead or lag exceeds the aforementioned upper limit the "bit" circulates back and forth between one of the outermost storage elements and the storage element between it and center storage element. Because of the interposition of an "OR" logic circuit, the positive output voltage to the input of signal generator 18 will be continuous so long as the "bit" remains in one of the two outermost storage elements.

It may be assumed that when one of positive voltage is supplied from generator 18 to one of the inputs summer-integrator 7 that the latter responds to increase the output of power supply to motor 5 to thus cause it to speed up and get back in position phase step with the reference generator. Conversely, when the other positive voltage is supplied to summer-integrator 7 the latter responds to decrease the output of power supply to motor 5 so that the latter will be slowed down to bring it back within desired limits of phase correspondence with the reference generator.

It has been found if it is desired to operate motor 5 at a very slow speed then the system described in the aforementioned Strand and Kintner patent will provide instantaneous speeds other than the desired value because of low frequency of the shaft phase displacement correction signal. The pulses per unit time fed into counter 12 from the adjustable reference generator 10 will be low, and the output pulses supplied from pulser driver 14 will be reduced further by a factor $2^n$, where n is an integer. Thus, the output of phase displacement generator 18 will not shift very frequently, and the instantaneous speed of motor 5 may very widely during corrective action, although the average speed will be correct. This condition is not unique to the aforementioned control system in this respect, and is true of all heretofore known forms of digital motor control affording position phase regulation.

The addition of constant frequency generator 19 to supply pulses at a fixed rate regardless of the reference motor speed overcomes this low frequency, slow speed position correction. Let it be assumed that reference generator 10 is adjusted to generate pulses at 200 c.p.s. when the system is capable of providing 3,500 c.p.s. maximum at the designed maximum motor speed. Further, let it be assumed that generator 19 has a fixed frequency output of 1,000 c.p.s. Thus, assuming proper action of pulse separator 20, counter 12 will receive 200 c.p.s. from generator 10 and an additional 1,000 c.p.s. from generator 19, making a total of 1,200 c.p.s. The input to pulser-driver 14 will then be at a sufficient rate to cause frequent and rapid operation of phase displacement generator 18 in one direction. As I similarly add the 1,000 c.p.s. pulses from generator 19 to those produced by tachometer generator 11, the output to pulser-driver 15 will likewise be at a sufficient rate to cause corresponding operation of generator 18 in the opposite direction. In other words, although the motor may be running quite slowly, as prescribed by reference generator 10, the rate of input pulses to phase displacement generator 18 will be at a minimum rate as determined by the fixed rate of output pulses of generator 19. Accordingly, the motor shaft phase displacement corrective action will be sufficiently rapid to prevent wide departures from any desired speed.

The pulse separators 20 and 21, which are identical in construction are important in insuring that each of the pulses generated in constant frequency generator 19 are added to the pulses generated by reference generator 10 and tachometer generator 11, respectively, without cancellation due to coincidental or near coincidental arrivals.

The construction of these pulse separators will now be described in conjunction with FIG. 2. As pulse separator 21 is identical to separator 20 the details are omitted for the sake of simplicity.

Generator 10 is a multivibrator transistor oscillator. It comprises a transistor T3 having its emitter connected to ground and its collector connected to an output terminal 25, and in series with a resistor R1 to −10 volts potential. Its base is connected in series with a capacitor C3 to the collector of another transistor T4 which has its emitter connected to ground. The collector of T4 is connected in series with a resistor R2 to −10 volts and the base of the latter is connected in series with a capacitor C4 to the collector of T3 and output terminal 25. The base of T4 is also connected in series with a resistor R3 and a variable resistor VR4 to −10 volts potential and the base of T3 is similarly connected in series with a resistor R5 and a variable resistor VR6 to −10 volts. The adjusting elements of VR4 and VR6 are interconnected to provide corresponding adjustments of their resistance values. In accordance with the effective values of resistance provided VR4 and VR6 and capacitance provided by C3, generator 10 will produce a train of pulses 10a of the form depicted in FIG. 3 which have a constant frequency and time duration. Operation of the same kind of reference pulse generator is described in detail in the aforementioned Strand and Kintner patent and reference should be made thereto for a complete understanding of how generator 10 functions to provide a train of pulses.

The design of constant frequency pulse generator 19 is quite similar to that of adjustable reference pulse generator 10. Transistors T5 and T6 correspond to transistors T3 and T4, capacitors C7 and C8 correspond to capacitors C3 and C4, and resistors R7, R8, R9 and R11 correspond to resistors R1, R2, R3 and R5, respectively. Fixed resistors R10 and R12 are used in place of variable resistors VR4 and VR6 of generator 10. It may be assumed that the resistance values of the resistors and capacitors of pulse generator 19 are selected to provide a constant frequency of pulse output at 1,000 cycles per second at its output terminal 29. The wave forms 19a in FIG. 3 depict the pulses provided at terminal 29.

Output terminal 25 of pulse generator 10 is connected through a conductor 30 to the input terminal 31 of pulse separator 20, and the output terminal 29 of pulse generator 19 is connected in series with a conductor 32 to a second input terminal 33. Pulse separator 20 has a pulse output terminal 34 connected to the collector of a transistor T7. The collector of transistor T7 is connected in series with a resistor R13, to −10 volts, and its emitter is connected to ground. The base of T7 is connected through like resistors R15 and R16 to the collectors of transistors T8 and T9, respectively. Transistor T8 has its collector connected in series with a resistor R17 to −10 volts and its base is also connected to −10 volts in series with a resistor R18. The emitter of T8 is connected to ground. The base of T8 is also connected in series with a capacitor C9 to the collector of a transistor T10 of a transistor flip-flop pair T10–T11 which has an auxiliary transistor T12 connected in parallel with transistor T11.

Transistor T10 has its collector connected in series with a resistor R20 to −10 volts, and is also connected in series with a resistor R21 to the base of T12. T10 has its emitter connected directly to ground, and its base is connected in series with a resistor R22 to ground, in series with a resistor R23 to the collectors of transistors T11 and T12, and in series with a resistor R24 and resistor R15 to the base of transistor T7. The emitter of T12 is connected to ground and its base is connected to ground in series with a resistor R25. The emitter of T11 is connected directly to ground and its base is connected to ground in series with a resistor R26 and to pulse input terminal 31 in series with a resistor R27. The collectors of T11 and T12 are both connected in series with a resistor R28 to −10 volts.

The transistor T9 is connected in a circuit identically like that aforedescribed for transistors T8, T10, T11 and T12, and such circuit includes transistors T13 and T14 of a flip-flop pair and the auxiliary transistor T15 connected in parallel with transistor T14. The latter circuit has a capacitor C10 corresponding to C9, and resistors R29 to R40 corresponding to resistors R17 and R28 in the aforedescribed circuit.

Each of the circuits comprising transistors T8–T10–T11 and T12 and T9–T13–T14 and T15 provide for shifting transistor T7 from a non-conducting state, wherein output terminal 34 is below ground potential, to a conducting state whereas terminal 34 is at ground potential whenever either of the transistors T8 and T9 are rendered non-conducting. This will occur whenever positive going pulses are impressed at either of the input terminals 31 and 33 even though these may be received coincidentally as will hereinafter be explained.

Pulse separator 20 additionally comprises a "clock" circuit having transistors T16 and T17. The emitters of T16 and T17 are connected to ground and their collectors are connected in series with resistors R42 and R43, respectively, to −10 volts. The collector of T16 is additionally connected to its base in series with a resistor R44, and to the base of T17 in series with a capacitor C11. The collector of T17 is connected to its base in series with a resistor R45, and is connected in series with a capacitor C12 to the base of T16. The point common between the collector of T16 and capacitor C11 is connected in series with a capacitor C13 and a diode CR1 to the base of transistor T12. A resistor R46 is connected from the point common between C13 and CR1 to ground. The point common between the collector of transistor T17 and capacitor C12 is connected in series with a capacitor C14 and a diode CR2 to the base of transistor T15. A resistor R47 is connected from the point common between C14 and CR2 to ground.

It may be assumed that the capacitance values of C11 and C12 and resistance values of R44 and R45 are such that the last mentioned "clock" circuit renders T16 and T17 alternately conducting at a rate of 16,000 times a second. Thus the collector of T16 will shift from a negative potential to ground potential and remain at ground potential for approximately 30 microseconds before going negative again. The same will be true with respect to the collector of T17, but it will go positive when the collector of T16 goes negative and vice versa. The pulse trains 16a and 17a in FIG. 3 depict the pulses generated at the collectors of transistors T16 and T17, respectively.

Initially let it be assumed that no pulses are impressed at input terminals 31 and 33, and thus would both be negative with respect to ground. Accordingly, transistor T11 of flip-flop pairs T10–T11 will then be conducting and transistor T14 of the flip-flop pair T13–T14 will be conducting. Consequently the transistors T10 and T13 will both be non-conducting. Due to current flow from ground through the emitter base circuits of transistors T8 and T9 and resistors R18 and R30, respectively, to −10 volts, both of the last mentioned transistors will be rendered conducting and their collectors will be at ground potential. Consequently the base of transistor T7 will be biased sufficiently high as to hold the latter non-conducting. The collector of T7 and hence output terminals 34 will be at −10 volts potential.

Now let it be assumed that a pulse 19a is impressed at input terminal 33. The potential on the base of T14 is thereby raised to a value rendering the latter non-conducting but until a pulse from the "clock" circuit is concurrently impressed on the base of transistor T15, transistor T13 will be maintained non-conducting as transistor T15 will be conducting to prevent the point common to the collectors of T14 and T15 being shifted above ground potential. Now let it be assumed that shortly after the pulse 19a is impressed at terminal 33, transistor T16 of the "clock" circuit is rendered conducting to shift its collector to ground potential. The lower plate of C13 is thereby suddenly raised to ground potential, and as its upper plate was at ground potential due to its connection to ground through resistor R46, a high transient current flows through diode CR1 and resistors R33 and R32 to −10 volts. This raises the potential of the base of transistor T15 to a value rendering the latter non-conducting and consequently transistor T13 is rendered conducting.

Conduction of T13 shifts its collector to ground potential, and as capacitor C10 has had its right-hand plate charged to a potential near ground potential, a high transient current will flow through resistor R30 to −10 volts. This momentarily raises the potential of the base of transistor T9 to a value rendering the latter non-conducting. The collector of T9 will then be shifted in potential to a value sufficiently low that current will flow from ground through the emitter base circuit of T7, and resistors R15 and R29 to −10 volts and T7 will be rendered conducting. Conduction of T7 shifts its collector and hence output terminal 34 to ground potential.

After capacitor C10 discharges sufficiently the potential of the base of T9 drops to a value rendering T9 conducting again which results in T7 being rendered conducting for a timed interval to produce a positive going pulse at its collector and output terminal 34 of approximately 10 micro-sec. duration as shown in graph 34a in FIG. 3.

Now let it be assumed that the next pulse is impressed at terminal 31. Accordingly, the action will be the same with respect to transistors T11 and T12 as heretofore explained in conjunction with transistors T14 and T15. T15 cannot be rendered non-conducting until transistor T17 of the "clock" circuit is rendered conducting. When T12 is thereafter rendered non-conducting T10 is rendered conducting, and T8 is accordingly rendered non-conducting for a timed interval. This causes T7 to be rendered conducting for a corresponding timed interval to produce another positive going pulse of 10 micro-secs. duration at output terminal 34.

It will be apparent that whenever input terminals 31 or 33 go negative following impression of aforementioned positive going pulses thereon, transistors T11 and T14 will respectively be rendered conducting to render the transistors T10 and T13 non-conducting, as the case may be. This effects reset of the respective flip-flop pairs.

The extreme situation will be considered, which is that obtaining when positive going pulses are impressed at input terminals 31 and 33 in exact time coincidence. Also, let it be assumed that reference pulse generator 10 is set for a maximum frequency of 3.5 kc. This means that the pulses of the latter will have a duration of approximately 142 micro-sec. The pulse duration of the pulse impressed at input terminal 33 from the 1 kc. constant frequency generator will be approximately 500 micro-secs.

Now with pulses of 142 micro-sec. and 500 micro-sec. durations being simultaneously impressed on input terminals 31 and 33 of pulse separator 20, the next shift from non-conduction to conduction of transistors T16 and T17 of the "clock" circuit will determine which of the coincident input pulses will cause the timed conduction of T7. Let it be assumed that T16 is first rendered conducting. This will then result in T7 being rendered conducting to provide the timed turn-off of transistor T9. By the time transistor T7 is rendered conducting, and thereafter non-conducting, a time in excess of 10 micro-secs. but less than 30 micro-secs. will elapse. Thirty micro-secs. after T16 is first rendered conducting, T17 is rendered conducting and T16 is simultaneously rendered non-conducting. Due to the fact that the duration of the pulse at input terminal 31, will under the assumed extreme situation be a minimum of 142 micro-secs. this last mentioned following conduction of transistor T17 will occur sufficiently soon to effect timed turn-off of transistor T10 and simultaneous timed turn-on of transistor T7 before the pulse at terminal 33 disappears. Accordingly it will be apparent that under conditions other than the aforedescribed extreme situation, pulse separator 20 will function to pass a number of pulses equal to the sum of all pulses impressed at its input terminals 31 and 33 regardless of time coincidence or non-coincidence of pulses at these two input terminals.

It will be understood that pulse separator 21 will function in a similar manner to that above described for pulse separator 20. The graphic representation of pulses set forth in FIG. 3 will also be representative of the action afforded by separator 21 in response to pulses supplied thereto from digital tachometer generator 11 and generator 19, taking into account that the duration, width, and frequency of pulses supplied from generator 11 will vary under condition of acceleration and deceleration.

It will be apparent that there are other means of obtaining pulse separation so the output will be the sum of two input frequencies whether the input frequencies are coincident or not. The above describes one representative means.

If desired, generator 19 can be made a variable frequency generator as shown as 19b in FIG. 4. With this modification the adjusting elements of resistors VR4 and VR6 of reference generator would be mechanically coupled to the corresponding resistor elements R10A and R12A of generator 19b so that the adjustments would be in an inverse relation. That is, as the frequency of pulse output of generator 10 is increased, the pulse output frequency of generator 19b would be decreased in a fixed ratio to the increase in frequency of pulse output of generator 10 and vice versa. With generator 10 at maximum designed frequency output, the output frequency of generator 19b could be substantially zero, but need not be.

While the various signal generators, inclusive of generators 19 and 19b, have been assumed to provide square wave type of pulse outputs, they need not be. Modifications well within the skill of the workers in the art can be made to pulse separators 20 and 21 to accommodate sinusoidal and other forms of generators producing signals which vary periodically between limits. The present invention contemplates that generators 19 and 19b need not be limited to any particular type of periodic cyclic signal generator.

I claim:

1. In a control system for a motor, a generator producing a first signal which varies between limits periodically at a fixed but adjustable frequency, a second generator producing a second signal which varies periodically between limits at a frequency variable in accordance with the speed of said motor, and means providing motor position phase correction whenever the time difference phase displacement between the aforementioned signals exceeds a predetermined amount, of means including a third generator providing a third signal which varies periodically, means for subjecting the first mentioned means to the sum of the cycles of said first and third signals, and means for subjecting said first mentioned means to the sum of the cycles of said second and third signals thereby to insure that the frequency of corrective action of said first mentioned means is always equal to or greater than the frequency of said third signal.

2. In a digital control system for an electric motor, the combination with a variable frequency digital pulse generator, a pulse generator affording pulses at a frequency in accordance with the motor speed and means providing motor position phase correction whenever the time difference phase displacement between the pulses generated by said pulse generators exceeds a predetermined amount, of means for increasing the frequency of the corrective action of said first mentioned means throughout the motor speed range comprising a third pulse generator, means for subjecting the first mentioned means to the sum of the pulses generated by said variable and fixed frequency pulse generators, and means for subjecting said first mentioned means to the sum of the pulses generated by the pulse generator providing pulses in accordance with the motor speed and the pulses generated by said third pulse generator.

3. The improvement in a digital motor control system for an electric motor according to claim 2, wherein said third generator is a fixed frequency pulse generator.

4. The improvement in a digital motor control system for an electric motor according to claim 2, wherein said third generator has a fixed but adjustable frequency of pulse outputs and wherein means are provided to afford adjustment of the pulse output frequency of said third generator in an inverse relation to the variation of the pulse output of the variable frequency pulse generator and vice versa.

5. The improvement in a digital motor control system according to claim 2, wherein the last two specified means each comprise pulse separating means which insure that the sum of the pulses from the two pulse generators connected therewith are effectively passed on without cancellation due to time phase coincidence or near coincidence to insure that the aforestated corrective action of the first specified means will be in accordance with the sum of the pulses supplied by the respective pairs of cooperating pulse generators.

6. The improvement in a digital motor control system according to claim 5, wherein said pulse separating means each comprise a pair of input terminals in circuit with the respective pairs of the specified pulse generators, an output terminal, a free running clock circuit and means in circuit with each input terminal, said clock circuit and said output terminal, said like means each when subjected concurrently to a pulse at its input terminal and a clock pulse providing a pulse at said output terminal, and said clock circuit subjecting said like means to control pulses alternately at a predetermined frequency which is greater than the frequency of any of the aforementioned pulse generators.

7. The improvement in a digital motor control according to claim 6, wherein said pulse separating means further comprises a normally non-conducting transistor having its collector in circuit with said output terminal, wherein each of said like means comprises a normally conducting transistor in circuit with the base of said normally non-conducting transistor and rendering the latter conducting whenever it is non-conducting, second and third normally conducting transistors having parallel connected emitter-collector circuits with one of the latter having its base in circuit with one of said input terminals and the other thereof having its base in circuit with said clock circuit, a fourth transistor having its base in circuit with the collectors of said second and third transistors, and an R-C circuit between the collector of said fourth transistor and the base of said first transistor, said fourth transistor being held non-conducting when either of said second and third transistors are conducting and being rendered conducting when input and clock pulses are consecutively impressed on the bases on said second and third transistors to subject the base of said first transistor to a transient potential rendering the latter non-conducting for a timed interval.

No references cited.

ORIS L. RADER, *Primary Examiner.*

J. J. BAKER, *Assistant Examiner.*